United States Patent [19]

Pratsinis et al.

[11] Patent Number: 5,525,320
[45] Date of Patent: Jun. 11, 1996

[54] PROCESS FOR ALUMINUM NITRIDE POWDER PRODUCTION

[75] Inventors: Sotiris E. Pratsinis, Cincinnati, Ohio; M. Kamal Akhtar, Glenburnie, Md.; Guizhi Wang, Dayton; Siddhartha Panda, Cincinnati, both of Ohio

[73] Assignee: University of Cincinnati, Cincinnati, Ohio

[21] Appl. No.: 273,360

[22] Filed: Jul. 11, 1994

[51] Int. Cl.$^6$ ................... C01B 21/064; C01B 21/076; C01B 21/072

[52] U.S. Cl. ................... 423/290; 423/411; 423/412

[58] Field of Search ................... 423/290, 411, 423/412

[56] References Cited

U.S. PATENT DOCUMENTS

| | | |
|---|---|---|
| 3,598,526 | 8/1971 | Huml et al. . |
| 3,848,068 | 11/1974 | Rice ........................... 423/412 |
| 4,484,943 | 11/1984 | Miura et al. ................. 423/412 |
| 4,556,416 | 12/1985 | Kamijo et al. .............. 423/290 |
| 4,610,857 | 9/1986 | Ogawa et al. . |
| 4,612,045 | 9/1986 | Shintaku . |
| 5,126,121 | 6/1992 | Weimer et al. . |
| 5,178,844 | 1/1993 | Carter et al. ................ 423/411 |
| 5,219,804 | 6/1993 | Weimer et al. . |
| 5,234,712 | 8/1993 | Howard . |

FOREIGN PATENT DOCUMENTS

| | | |
|---|---|---|
| 61-91008 | 5/1986 | Japan . |
| 64-65100 | 3/1989 | Japan . |
| 226811 | 1/1990 | Japan . |
| 226812 | 1/1990 | Japan . |
| 2283605 | 11/1990 | Japan . |
| 2283604 | 11/1990 | Japan . |

OTHER PUBLICATIONS

*Material Synthesis in Aerosol Reactors*, Chemical Engineering Process, Sotiris E. Pratsinis, University of Cincinnati, Sebatian V. R. Mastrangelo, E. I. Dupont de Nemours Co. Edgemoore, Delaware, pp. 62–66, May, 1989.

*Synthesis Of Fine AlN Powder By A Floating Nitridation Technique Using An $N_2/NH_3$ Gas Mixture*, Isao Kimura, Kenji Ichiya, Masahiro Ishii, Noriyasu Hotta, Department of Chemical Engineering, Faculty of Engineering, Niigata University, Niigata 950–21 Japan, Teruo Kitamura, Showa Aluminum Corporation, 6–224 Kaisan–cho Sakai 590, Japan, pp. 303–304 (1989) Journal of Material Science Letters.

*Synthesis of Superfine Aluminum Nitride Particles by Vapor Phase Reaction*, Katsu Yokota, Metal Arts, Takaoka Junior College, Shuichi Yagyu, Postgraduate School. Osaka University, Kazuhiko Majima and Hiroshi Hagai, Engineering Dept., Osaka University, Jan. 24, 1992, (a translation of the article appearing at Powder and Powder Metallurgy—Japanese Journal vol. 38, No. 3, pp. 382–385).

*Some Properties Of Aluminium Nitride Powder Synthesized By Low–Pressure Chemical Vapour Deposition*, Itatani, K. Sano, F. S. Howell, A. Kishioka, M. Kinoshita, Department of Chemistry, Faculty of Science and Technology, Sophia University, 1 Kioi–cho, Chiyoda–ku Tokyo 102, Japan.

*Elements of Materials Science and Engineering*, Lawrence H. Van Vlack, University of Michigan, Ann Arbor, Michigan, Addison–Wesley Publishing Company, Sixth Edition, pp. 95–99 (1989).

*Synthesis of Aluminium Nitride By Nitridation Of Aluminum Metal In An Aerosol Flow Reactor*, Thesis by Thomas Hashman, University of Cincinnati, Department of Chemical Engineering (1991).

D. Fisher, "AlN And BN Powders For Advanced Applications", *Ceram. Eng. Sci., Proc.*, 6[9–10] 1305–1312 (1985).

N. Hotta, I. Kimura, K. Ichiya, N. Saito, S. Yasukawa, K. Tada and T. Kitamura, "Continuous Synthesis And Properties Of Fine AlN (List continued on next page.)

Primary Examiner—Wayne Langel
Attorney, Agent, or Firm—Frost & Jacobs

[57] ABSTRACT

Processes for the direct manufacture of nitride powders suitable for low temperature sintering are provided. An elemental vapor is contacted with a nitriding gas at temperatures between 1400 and 1973 K and atmospheric pressure to produce nitride powder.

23 Claims, 6 Drawing Sheets

OTHER PUBLICATIONS

Powder By Floating Nitridation Technique," *Nippon Ceramics Kyokai Gakujutsu Ronbun–Shu*, 96 [7]731–735 (1988).

N. Hotta, I. Kimura, A. Tsukuno, N. Saito, and S. Matsuo, "Synthesis of AlN By The Nitridation Of The Floating Al Particles in $N_2$ Gas," *Yogyo Kyokai–Shi*, 95[2] 274–278 (1987).

K. Baba, N. Shohata, and M. Yonezawa, "Synthesis And Properties Of Ultra–Fine AlN Powder By rf Plasma," *Appl. Phys. Lett.*, 54[23] 2309–2311 (1989).

M. Yoshimura, M. Nishioka, N. Ishizawa, and S. Somiya, "Synthesis Of AlN And TiN From Al and Al–Ti Alloy By Arc Image Heating", *J.Mat. Sci. Lett.* 9[3] 322–325 (1990).

K. Ishizaki, T. Egashira, K. Tanaka, P. B. Celis, "Direct Production Of Ultra–Fine Nitrides ($Si_3N_4$ and AlN) And Carbides (SiC, WC And TiC) Powders By The Arc Plasma Method," *J. Mat. Sci.*, 24 [?] 3553–3559 (1989).

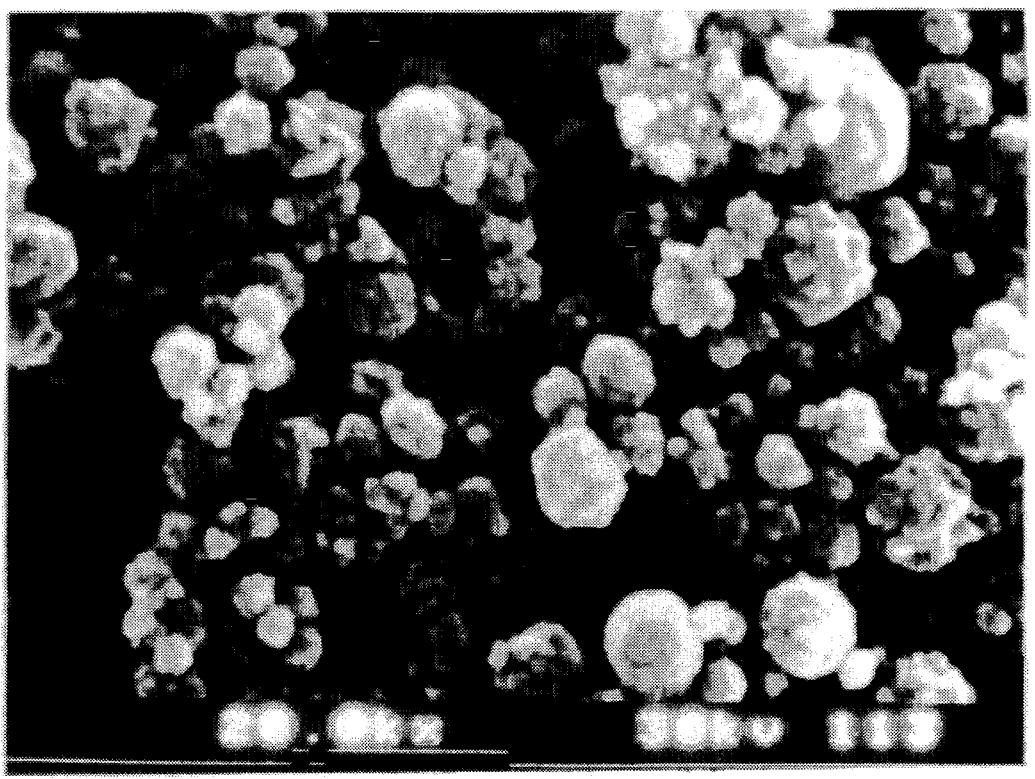
FIG. 2A    1 µm 20,0 KX
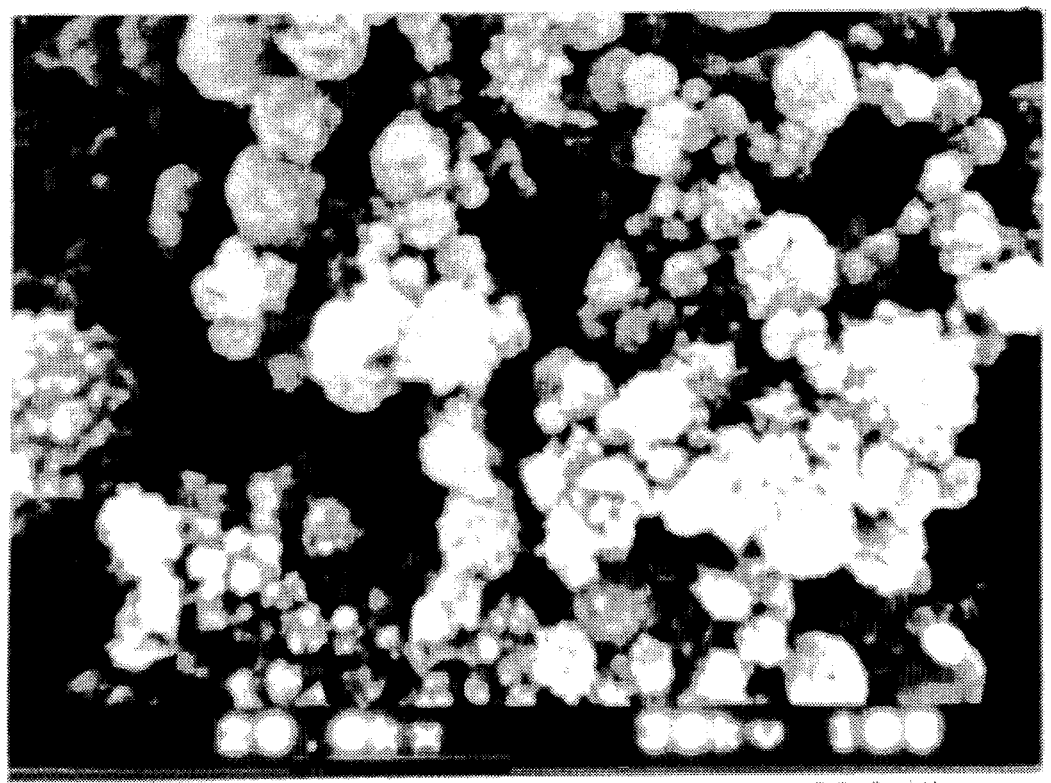
FIG. 2B    1 µm 20,0 KX

PROCESS FOR ALUMINUM NITRIDE POWDER PRODUCTION

FIELD OF THE INVENTION

The invention relates generally to processes for the production of nitride powders. More specifically, the present invention relates to processes for preparing nitride powders having low particle size, narrow particle size distribution, high specific surface area and yet resulting in a high yield of product, high conversion of reactants and a high rate of reaction. Even more specifically, the present invention provides gas phase, homogeneous reaction processes for aluminum nitride powder manufacture, which processes are environmentally benign in that if any by-products are produced, they are inherently separated and recyclable.

BACKGROUND OF THE INVENTION

Aluminum nitride exhibits a variety of properties that makes it unique among ceramic materials. It has a low electrical conductivity ($10^{-11}$ to $10^{-13}$ $W^{-1}cm^{-1}$) and a moderately low dielectric constant and dielectric loss. At the same time it has a very high theoretical thermal conductivity (319–320 W/m.K). These properties make the material especially useful in applications such as semiconductor substrates, where beryllium oxide (BeO) has been extensively used in the past. The use of a high thermal conductivity electrical insulator for substrates is essential in the development of miniature electronics because the increased component density creates large amounts of waste heat that must be quickly dissipated through the substrate. Also the thermal expansion coefficient of AlN ($2.64\times10^{-6}K^{-1}$) is much lower than that of BeO ($5.7\times10^{-6}$ $K^{-1}$) and alumina ($7.2–8.6\times10^{-6}$ $K^{-1}$), and it closely matches that of silicon. Therefore, electronic devices supported by AlN are less likely to fail from thermal cycling than those supported by BeO or alumina substrates. The thermal conductivity of AlN, though slightly less than that of BeO at room temperature, is also less temperature sensitive than that of BeO and exceeds that of BeO above about 473 K.

Another potential application for AlN is as a packaging material for electronic items. Packages made of AlN could reduce cooling problems and allow higher power densities. AlN also shows corrosion resistance to a wide variety of materials. It is wetted by molten aluminum, but does not react with it. It is not attacked by uranium, lithium, many ferrous alloys and some superalloys. It is also stable against molten salts such as carbonate eutectic mixtures and cryolite. AlN is finding increased applications in crucibles and hardware for containing or processing many of these corrosive materials.

AlN also has a variety of structural and refractory applications because it exhibits the high strength and high temperature stability associated with most non-oxide materials. It has also been suggested for use as a filler in metals or polymers, to alter the properties of the matrix material. In metals, for example in aluminum, AlN can be used much like silicon carbide to stiffen and strengthen the matrix. Aluminum nitride has an added advantage over silicon carbide in this application because it does not react with the metal. This allows longer processing times for the composite in the molten form, as well as more control over the interface between the matrix and the filler. In polymers, AlN can be used to increase the stiffness of the polymer, to reduce the thermal expansion of the polymer or to boost the thermal conductivity of the polymer. High thermal conductivity polymers have a wide variety of applications, from sealants for electronic applications to heat-dissipating structural, adhesive or insulating materials.

Mellor (1928) described the early production of aluminum nitride (AlN), crediting Briegleb and Geuther (1862) as being the first to document a method for its production. Their method involved heating aluminum in a nitrogen atmosphere to yield (impure) AlN according to the nitridation reaction:

$$Al(s)+\tfrac{1}{2}N_2(g)=AlN(s) \qquad (1)$$

Mellor also reported the commercial production of AlN by Serpek via the carbothermal reduction of alumina using coal and bauxite as starting materials:

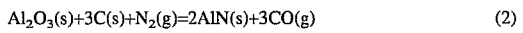

$$Al_2O_3(s)+3C(s)+N_2(g)=2AlN(s)+3CO(g) \qquad (2)$$

As reactions observed in AlN powder production, (1) and (2) above are by far the most prevalent (Fister, 1985). Purity has been increased over the years by increasing the purity of reactants and by reducing the particle size of the solid reactants.

U.S. Pat. No. 4,160,857 to Ogawa and Abe (1986) described a general method for manufacturing ceramic powders that utilized a plasma jet and produced particles less than 0.1 μm in diameter. The process of Ogawa et al. was deemed to be advantageous in that the reaction occurred between gaseous species, which could result in potentially higher purity powders than those produced frown heterogeneous reactions, although no information concerning purity was provided. Details on the polydispersity of the products were also absent.

Shintaku (1986) produced AlN powder by the direct nitridation of liquid aluminum using gaseous nitrogen. Here, molten aluminum was atomized into $N_2(g)$ which was at a minimum temperature of 1073 K. The AlN produced in the cited examples had a maximum purity of 60 wt % AlN (the remainder being Al) and an average particle size of 0.1–0.2 μm. Further processing (heating at elevated temperatures under a $N_2$ atmosphere) was required to achieve "substantially 100% aluminum nitride."

Hotta et al. (1987, 1988) applied the direct nitridation of liquid aluminum particles using $NH_3(g)$ according to the reaction:

$$Al(l)+NH_3(g)=AlN(s)+3/2H_2(g) \qquad (4)$$

Hotta et al. manufactured hollow, spherical AlN particles over the size range 4–12 μm, but this range was reduced to 0.1–0.2 μm through milling. The hollow particles are reasoned to be the result of the kinetics of the reaction where it is believed that a nitride layer is formed around the molten aluminum, which expands more than the surrounding AlN layer, causing fissures in the surface through which the molten aluminum escapes. In the Hotta et al. reactor, the product powder had to be scraped repeatedly from the reactor walls with a hot tungsten wire in order to establish a continuous process.

Baba et al. (1989) utilized radio frequency (rf) plasma techniques, directly nitrided Al(g) with $NH_3(g)$, and produced particles about 60 nm in diameter, with a total metallic content of 100 parts per million (ppm) as measured by X-ray diffraction (XRD). The Al content was not measurable.

Yoshimura et al. (1990) also used homogeneous, gas-phase nitridation to produce AlN powder. An arc image lamp was focused onto a solid block of aluminum to vaporize it. Both $NH_3$ and nitrogen were tried as nitriding agents, and it was found that, while nitrogen does nitride the aluminum, the time required to achieve results similar to those using ammonia was nearly two orders of magnitude higher. The percent conversion varied from (approximately) 10% at a residence time of 1.5 seconds, to 95% at 20 seconds, when ammonia was used. Information on the particle sizes produced was minimal, but scanning electron microscopy (SEM) pictures showed an average size of about 0.5–1.0 μm for the 20 second residence time product. Purity was found to increase with residence time, the amount of aluminum gradually decreasing in the product with increasing residence time.

Ishizaki et al. (1990), made ultra-fine nitrides, including AlN, using a plasma furnace that vaporized the aluminum and then reacted it with $NH_3$. The particles were about 50 nm in diameter, and XRD revealed trace amounts of aluminum.

Kimura et al. (1988) presented experimental results discussing the effects of reactor temperature and flow rate of reactants on aluminum nitride particle size. This work indicated that increasing temperature resulted in a narrower size distribution and that particle size became smaller with increasing flow rate. The temperature effect was attributed to increased nucleation rate with temperature, but no explanation was offered for the effect of flow rate. It was probable that this was due to shorter residence times, allowing less time for particle growth. This work was extended (Kimura et al., 1989) to include thermodynamic reasons for this choice of reaction system and to provide more information on the product powder. XRD analysis of the powders revealed only AlN. Uniform spherical particles were found to be formed at temperatures of 1373 K. or greater, as opposed to a mixture of rod shaped and spherical particles at lower temperatures. Unfortunately, the powders were deposited on the reactor walls instead of nucleating homogeneously.

In his thesis entitled "Synthesis of Aluminum Nitride by Nitridation of Aluminum Metal In an Aerosol Flow Reactor", Hashman (1992) studied the production of aluminum nitride powder using the $Al/N_2/Ar$ system. This system was utilized because of a larger high purity AlN region than other systems such as the $AlCl_3/NH_3/N_2$ system. Hashman preferred the $Al/N_2/Ar$ system over rite $Al/NH_3/Ar$ system because it produced greater conversion and product purity in Hashman's configuration. Hashman also taught that the aluminum vapor was introduced upstream of the nitriding gas to prevent surface reaction and nitridation of the solid aluminum used as a source of aluminum vapor.

U.S. Pat. No. 5,126,121 to Weimer et al. discloses a process for the manufacture of aluminum nitride powder having a surface area ranging from 2 to 8 $m^2/g$ and an oxygen content of less than 1.2 weight percent, by rapidly heating powdered aluminum in a nitrogen atmosphere.

U.S. Pat. No. 5,219,804 to Weimer et al. discloses a process for the manufacture of aluminum nitride powder having a surface area greater than 10 $m^2/g$, by nitriding powdered aluminum metal, alumina and carbon or mixtures of powdered aluminum metal and a compatible fine ceramic powder.

Itatani et al. (1993) describe the synthesis of AlN powder by chemical vapor deposition of vaporized aluminum with ammonia and/or nitrogen at low pressures (below 1 k Pa). The specific surface area for a pure nitrogen system is 8.1 $m^2/g$, increasing with increasing ammonia content to 77.5 $m^2/g$ (at 40% ammonia).

Pratsinis et al. (1989) generally describe material synthesis in aerosol reactors, defining aersol reactors as "systems in which particulates are made by gas phase chemical reactions."

SUMMARY OF THE INVENTION

It is a primary object of the present invention to produce aluminum nitride powders which are suited for low temperature sintering.

It is also an object of the present invention to produce aluminum nitride powders that have a finer grain size as produced, than those produced by prior art processes.

It is yet another object of the present invention to provide a process for the manufacture of aluminum nitride powders as described above.

It is a further object of the present invention to provide a gas-phase, homogeneous process for the manufacture of aluminum nitride powder by the direct nitridation of aluminum vapor.

It is yet another object of the present invention to produce aluminum nitride powder having high specific surface area, at least 10 $m^2/g$ (48.8 $ft^2/lb$).

In accordance with one aspect of the present invention, as shown in FIG. 1, there is provided a process for manufacturing nitride powder comprising the steps of: introducing a vapor selected from the group consisting of aluminum, boron and titanium, at a first position within an aerosol reactor; introducing a nitriding gas at a second position within said aerosol reactor upstream of said first position, at a minimum equivalence ratio of approximately 1.0; maintaining said aerosol reactor at a temperature equal to or greater than 1400 K. and at atmospheric pressure; and contacting and reacting said vapor with said nitriding gas to produce nitride powder. Preferably, the vapor is introduced into said aerosol reactor by means of a carrier gas. Even more preferably, carrier gas is selected from the group consisting of the noble gases, nitrogen, hydrogen and mixtures thereof. Preferably, the nitriding gas is selected from the group consisting of nitrogen, ammonia and mixtures thereof.

In accordance with another aspect of the present invention, as shown in FIG. 8, there is provided a process for manufacturing nitride powder comprising the steps of: generating, from a vapor source, an elemental vapor selected from the group consisting of aluminum, boron and titanium; introducing said vapor within an aerosol reactor using a carrier gas; introducing a nitriding gas within said aerosol reactor so as to prevent contact between said nitriding gas and said vapor source, at a minimum equivalence ratio of approximately 1.0; maintaining said aerosol reactor at a temperature equal to or greater than 1400 K. and at atmospheric pressure; and contacting and reacting said vapor with said nitriding gas to produce nitride powder. Preferably, the carrier gas is selected from the group consisting of the noble gases, nitrogen, hydrogen and mixtures thereof. Preferably, the nitriding gas is selected from the group consisting of nitrogen, ammonia and mixtures thereof.

BRIEF DESCRIPTION OF DRAWINGS

FIG. 2 (a and b) are SEM pictures of AlN powders produced by the process of the present invention using the $Al/NH_3/Ar$ system.

DETAILED DESCRIPTION OF THE INVENTION

Figure 1:
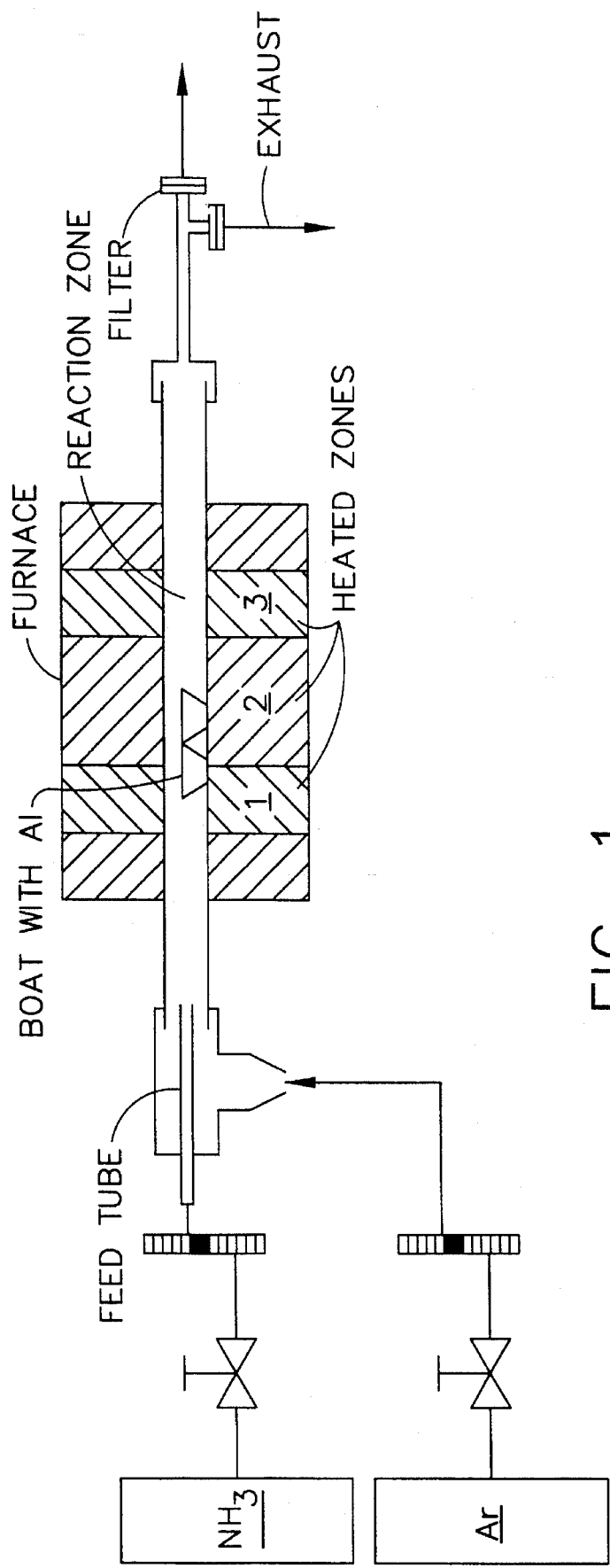
FIG. 1 is a schematic of an apparatus for practicing the present invention.

In a preferred embodiment of the processes of the present invention, aluminum nitride was synthesized by vaporizing and reacting the vaporized aluminum with NH$_3$ or N$_2$ in an externally heated tube flow reactor (as seen in FIG. 1) used as an aerosol reactor. The term "aerosol reactor" as used herein signifies a system in which particulates are made by gas phase chemical reactions. The reactor was a cast alumina tube (Coors Ceramics Co., 3.8 cm (1.5') outer diameter, 3.2 cm (1.25') inner diameter and 152.4 cm (5 ft.) long, of which 50 cm (19.7') constituted the aerosol reactor) which contained an inner nitriding gas (ammonia, nitrogen or a mixture thereof) feed tube (0.32 cm (0.125') outer diameter, 0.16 cm (0.063') inner diameter). High purity aluminum pellets (Aldrich, 99.99%) were used to generate aluminum vapor. The major impurities in the aluminum pellets were Fe: 400 ppm, Na: 220 ppm and Si: 160 ppm. In the preferred embodiment, the aluminum pellets were vaporized in an unglazed alumina boat as seen in FIG. 1. The aluminum containing boat was placed inside the reactor always downstream of the ammonia feed tube. It was found that if the aluminum pellets were positioned upstream of the nitriding gas (as in Hashman), large sized aluminum vapor particles resulted, which were considerably less reactive than the smaller sized particles having higher specific surface area, produced by placing the aluminum pellets downstream of the nitriding gas.

The reactor was required to be heated externally. Preferably, an electric furnace (Lindberg) with a maximum operating temperature of 1973 K. was used. Other methods of heating including electron beam heating, arc heating and plasma heating may also be used. Purified nitrogen (99.995%) and anhydrous ammonia (99.99%) were used as nitriding gases. Argon (99.998% from Wright Brothers) was optionally used as a carrier gas for the aluminum vapor. The reactor effluents passed through filters which were placed downstream of the reactor. The filters were used to collect the formed aluminum nitride powder. The aerosol reactor was carefully maintained in a substantially non-oxidizing state at all times until removal of the nitride powder. Powders were transferred from the filters for analysis.

The reactor was heated slowly, at a rate of 5–7 K./min, to reach the set temperature. During this heating, a small argon flow, usually 50–100 cm$^3$/min (3.1–6.1 in$^3$/min), was preferably maintained through the feed tube and the reactor to prevent vaporized aluminum from clogging the feed tube. Once the furnace reached the set temperature, the nitriding and carrier gases (if any) were introduced into the reactor. The flow rates were controlled with needle valves and checked with rotameters.

It was frequently found that the aluminum in the boat was nitrided when either a slow ammonia flow rate was used or the aluminum containing boat was placed even further downstream of the ammonia feed tube. Under such circumstances small amounts of grey powders were collected on the filter. This was overcome by reducing the distance between the nitriding gas feed tube and the boat to 5–7 cm (2–2.8').

The formed AlN powder was collected on polycarbonate filters (Nucleopore) downstream of the reactor tube. The XRD patterns of the powders were obtained by a Siemens D500 diffractometer (Cu-K$\alpha$ radiation, $\lambda$=1.5406 Å). The crystallite diameter was determined from the Scherrer equation (1978):

$$D=(0.9\cdot\lambda)/(B\cos\theta)$$

where $\lambda$ is the wavelength, B is the broadening of a diffraction line due to the particle size effect measured at half of its maximum intensity and $\theta$ is the diffraction angle. B is determined by the formula:

$$B^2=B_m^2-B_s^2$$

where $B_m$ is the measured breadth of the diffraction line and $B_s$ is the measured breadth of the standard. Silicon was used as the standard and $B_s$ was measured as 0.1039 Å. Particle morphology was obtained by SEM (Cambridge, Model 90B) and the specific surface area of the particles was obtained by the Brunauer, Emmett and Teller method for measurement of surface area (BET). The average grain size (diameter) was determined from the BET surface area assuming solid spherical grains and a theoretical density of 3.26 g/cm$^3$ (0.18 lb/in$^3$) (Sheppard, 1990). The particle morphology and primary particle size distribution were determined by TEM at The Dow Chemical Company (Akashi Beam Technology, EM –002B, 200 KV). The size distribution of the agglomerate particles was determined by Microtrac (Model SPA) analysis which sizes particles by light scattering.

Table 1 summarizes the preferred experimental conditions and results of crystallinity studies as well as the grain and crystallite size of the product AlN powders:

TABLE 1

| Exp. # | T(K) | (cm$^3$/min) | | $\phi$ | $\gamma$ | $\tau$ (s) | Phase XRD | Surface Area (m$^2$/g) | $D_{XRD}$ (nm) | $D_{BET}$ (nm) | Collection rate (g/hr) |
|---|---|---|---|---|---|---|---|---|---|---|---|
| | | Summary of experimental conditions and results | | | | | | | | | |
| | | Using ammonia as the nitriding gas | | | | | | | | | |
| | | $Q_{NH3}$ | $Q_{Ar}$ | | | | | | | | |
| 1 | 1673 | 860 | 2690 | 45.9 | 0.32 | 1.19 | AlN | 40 ± 3 | 28 ± 1 | 46 ± 3 | 0.12 |

TABLE 1-continued

Summary of experimental conditions and results

| Exp. # | T(K) | (cm³/min) | φ | γ | τ (s) | Phase XRD | Surface Area (m²/g) | $D_{XRD}$ (nm) | $D_{BET}$ (nm) | Collection rate (g/hr) |
|---|---|---|---|---|---|---|---|---|---|---|
| 2 | 1773 | 860  2690 | 15.9 | 0.32 | 1.12 | AlN | 31 ± 1 | 28 ± 2 | 59 ± 2 | 1.17 |
| 3 | 1873 | 860  2690 | 6.3 | 0.32 | 1.06 | AlN | 29 ± 3 | 28 ± 6 | 64 ± 6 | 2.34 |
| 4 | // | 100  2600 | 0.99 | 0.04 | 1.40 | Al + AlN | 54 ± 4 | 22 ± 2 | 34 ± 2 | 0.01 |
| 5 | // | 375  2690 | 3.2 | 0.14 | 1.23 | AlN | 26 | 34 | 71 | 0.22 |
| 6 | // | 550  2690 | 4.4 | 0.20 | 1.17 | AlN | 27 ± 4 | 32 ± 6 | 68 ± 3 | 0.55 |
| 7 | // | 750  2690 | 5.6 | 0.28 | 1.10 | AlN | 32 ± 4 | 29 ± 2 | 58 ± 4 | 0.06 |

Using nitrogen as the nitriding gas

| Exp. # | T(K) | $Q_{N2}$  $Q_{Ar,total}$ | φ | γ | τ (s) | Phase XRD | Surface Area (m²/g) | $D_{XRD}$ (nm) | $D_{BET}$ (nm) | Collection rate (g/hr) |
|---|---|---|---|---|---|---|---|---|---|---|
| 8 | 1673 | 26.0  389 | 11.9 | 0.07 | 10.2 | Al | | | | |
| 9 | // | 13.0  195 | 11.9 | 0.07 | 19.4 | Al | | | 20 ± 2 | |
| 10 | // | 164  640 | 38.6 | 0.26 | 5.26 | AlN | | | | |
| 11 | 1873 | 23.3  102 | 4.8 | 0.25 | 30.2 | Al | | | 38 ± 4 | |
| 12 | // | 40.9  53.6 | 11.2 | 0.76 | 40.0 | Al | | | 38 ± 7 | |
| 13 | // | 62.4  131 | 8.3 | 0.48 | 19.6 | AlN + Al | | | 11 ± 5 | |

Experiments #8, 9, 11 and 12, in Table 1, are not included within the scope of the present invention as claimed herein.

In experiments #1–3 (Table 1), ammonia was used as the nitriding gas. The reactor temperature was varied from 1673 K. to 1773 K. and 1873 K., while the flow rate of ammonia was 860 cm³/min (52.5 in³/min) and that of argon was 2690 cm³/min (164.2 in³/min). The equivalence ratio, ø, (defined as $N^o_{nitriding\ gas}N^o_{Al}$, where $N^o$ is moles entering reactor) were 45.9, 15.9 and 6.3 at 1673, 1773 and 1873 K., respectively. The equivalence ratio decreased as the temperature increased, since the amount of aluminum in the gas phase increased with temperature. The dilution ratio, γ, (defined as $((N^o_{nitriding\ gas}+N^o_{Al})N^o_{carrier}))$ was about 0.32 assuming that the gas stream was saturated with aluminum vapor (Table 1).

The XRD patterns of powders produced at the above conditions showed only AlN peaks. The XRD patterns also showed that hexagonal crystals were obtained. The particles were white, indicating high AlN purity (as recognized by Taylor and Lenie, 1960; and Kimura, 1989). Powders produced at lower temperatures, 1400, 1473 and 1573 K., and at low flow rates, resulted in a thin coating on the filters. At these conditions only a small amount of aluminum was vaporized and thus less material reached the filter. While the process of the present invention may be operated at temperatures as low as 1400 K., temperatures of 1673 K. and above are preferred.

FIG. 2 (a and b) shows SEM pictures of powders produced at 1673 and 1773 K. Particles were spherical aggregates, 0.2 to 1 µm in diameter, composed of grains (primary particles) between 0.05 and 0.2 µm in diameter. Grain sizes of the particles of aluminum nitride manufactured using the processes of the present invention ranged from 0.05 to 0.5 µm in diameter (sizes up to 0.2 µm were preferred).

Figure 3:
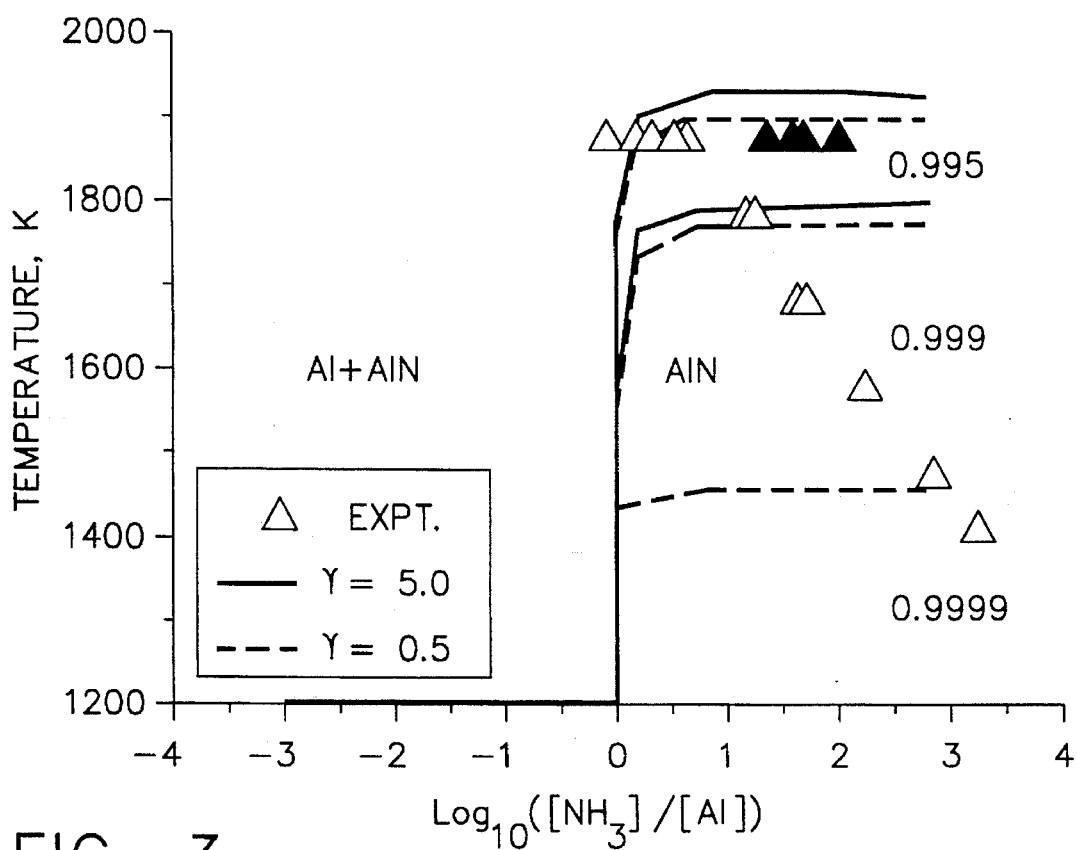
FIG. 3 is the phase diagram for the $Al/NH_3/Ar$ system at 1 atm.

FIG. 3 shows the experimental conditions in the form of a phase diagram. AlN powders obtained at 1400 K. would have a theoretical purity of 0.9999, those obtained at 1573 and 1673 K. had theoretical purities between 0.999 and 0.9999 while those produced at 1773 K. had a theoretical purity just below 0.999. These thermodynamic predictions were consistent with the XRD data that showed only AlN peaks in the samples. Powders synthesized at 1873 K. had a theoretical purity close to 0.995.

Figure 4:
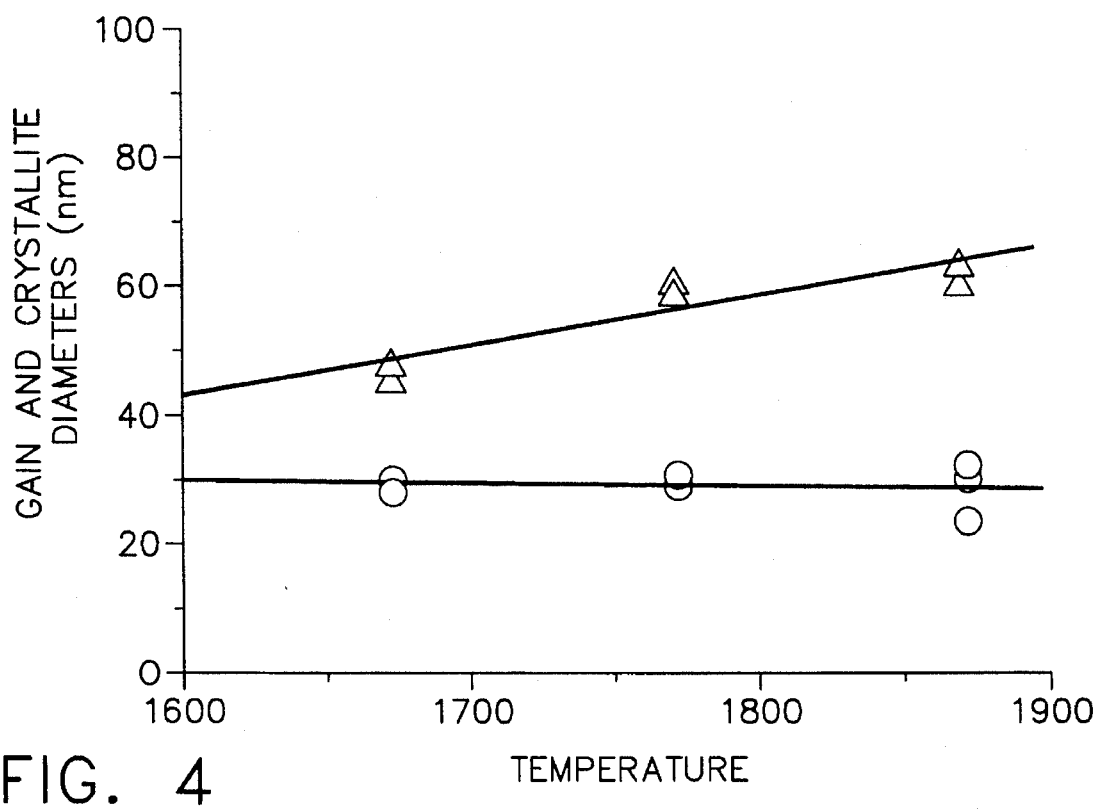
FIG. 4 shows the effect of temperature on AlN grain and crystallite diameters produced using the Al/NH$_3$/Ar system.

FIG. 4 shows the effect of temperature on AlN (examples 1–3 in Table 1). The crystallite size was rather constant at 28 nm, while the average particle (grain) diameter as determined by BET increased from 46 to 64 nm as the temperature was increased from 1673 K. to 1873 K. Clearly, each grain contained several crystallites. When the grain sizes from SEM (FIG. 2a and b) were converted into BET specific surface areas, the latter ranged from 36 to 9 m²/g (175.8 to 43.9 ft²/lb), in agreement with the trend in Table 1 (increase in temperature decreased specific surface area).

Temperature had a significant effect on the collection rate of AlN powder which is defined as the total weight of AlN collected on filters divided by the time of collection. When the temperature increased from 1673 to 1773 to 1873 K., the production rate increased from 0.12 to 1.17 to 2.34 g/hr (0.054 to 053 to 1.06 lb/hr).

Figure 5:
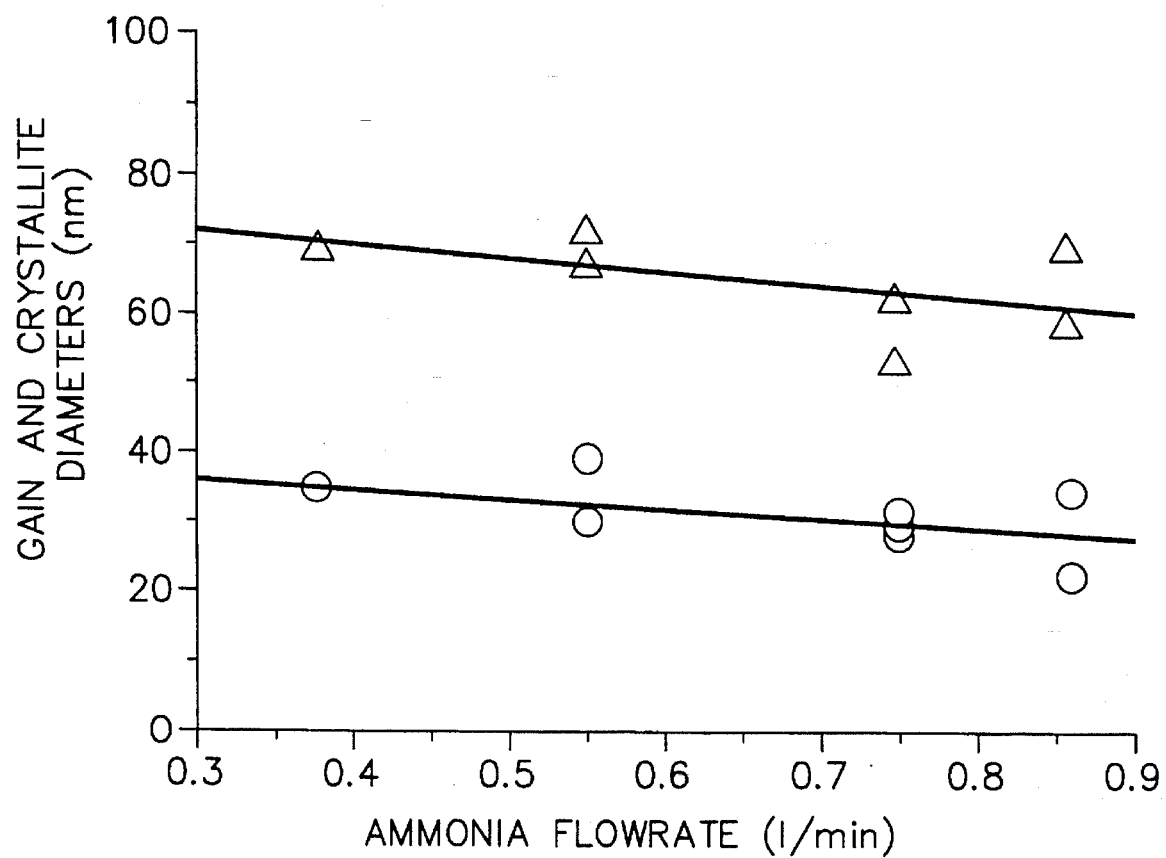
FIG. 5 shows the effect of ammonia flow rate on AlN grain and crystallite diameters produced using the Al/NH$_3$/Ar system.
Figure 6:
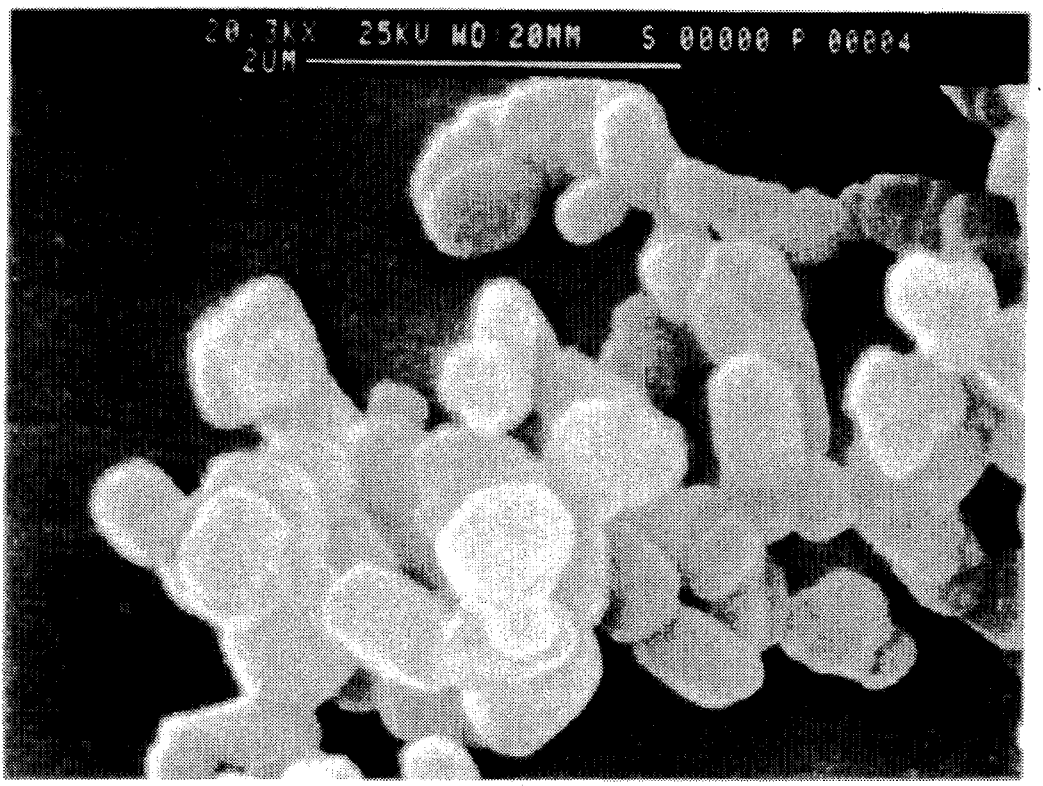
FIG. 6 is a SEM picture of AlN commercially available from Tokuyama Soda Company.

Yet another embodiment of the present process was conducted at 1873 K. with the carrier gas (argon) flow rate of 2690 cm³/min (164.2 in³/min), while the flow rate of ammonia was varied from 100 to 860 cm³/min (6.1 to 52.5 in³/min) at room temperature (exp. #3 and 5–7, Table 1). Pure AlN as determined by XRD was obtained within the ammonia flow rate range of 375–860 cm³/min (22.9 to 52.5 in³/min). The crystallite size ranged from 34 to 28 nm. The corresponding BET specific surface area ranged from 26 to 32 m²/g (127.0 to 156.3 ft²/lb) and the corresponding grain size ranged from 71 to 58 nm as shown in FIG. 5. When the ammonia flow rate was reduced to 100 cm³/min (6.1 in³/min), grey powders were collected and were determined to be a mixture of Al and AlN (via XRD) (expt.#4). The grain size of these powders was 34 nm corresponding to a BET specific surface area of 54 m²/g (263.7 ft²/lb).

The weight percentage of aluminum in the powder was obtained by correlating the aluminum weight and XRD intensities to the weight and XRD intensities of AlN (Tokuyama Soda Co.). 58% by weight of aluminum was determined to be present in the powders made at 1873 K. with an ammonia flow rate of 100 cm³/min (6.1 in³/min) (expt.#4).

High ammonia flow rates not only improved the product purity, but also enhanced product yield. As an example, at 1873 K. and 2690 cm³/min (164.2 in³/min) Ar, the average collection rate of AlN on filters varied from 0.22 g/hr to 2.34 g/hr (0.10 to 1.06 lb/hr) as the flow rate of ammonia increased from 375 to 860 cm³/min (22.9 to 52.5 in³/min) (expt. #'3 and 5–7). Increasing the ammonia flow rate resulted in a higher equivalence ratio of ammonia to vaporized aluminum, which enabled higher conversion of aluminum vapor. However, when a flow rate of 100 cm³/min (6.1 in³/min) ammonia was employed, only 0.01 g/hr (0.005 lb/hr) of powder was collected on the filters.

Finally, the specific surface area of commercially available AlN (The Dow Chemical Company XUS35544) is 3.2 m²/g (15.6 ft²/lb), substantially lower than that obtained by the process of the present invention (26–40 m²/g (126.9 to 195.3 ft²/lb)). The crystallite size of the commercial AlN is 50 nm, larger than that obtained by the present process.

In producing dense AlN ceramics having high thermal conductivity, the raw powders should possess excellent sinterability. A powder with a small particle size and narrow size distribution (as that obtained by the process of the present invention) satisfies such requirements (Kuramoto et al, 1989). The AlN powders produced in tiffs study were of high purity and large specific surface area.

Nitrogen may also be used as the nitriding gas. Experiments were conducted at 1673 and 1873 K., while the flow rate of nitrogen varied from 26 to 164 cm³/min (1.6 to 10 in³/min) and that of Ar from 53.6 to 640 cm³/min (3.2 to 39.1 in³/min) (exp. #8–13, Table 1). The flow rates were kept low to assure long enough residence times for conversion of aluminum to AlN. These prolonged residence times resulted in substantially lower powder yields than when $NH_3$ was employed.

Figure 7:
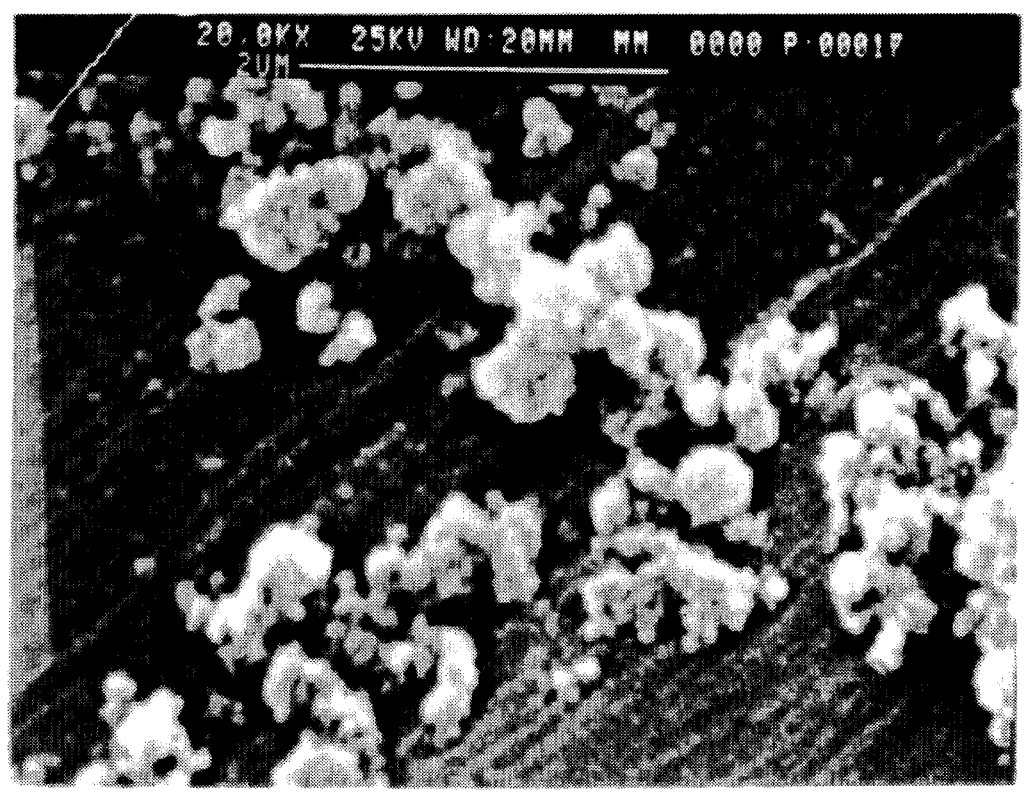
FIG. 7 is a SEM picture of AlN particles produced by the process of the present invention using the Al/N$_2$/Ar system.

White AlN was also obtained when nitrogen was used as nitriding gas (expt. #10, Table 1). When compared with the thermodynamic diagram, the powders had a theoretical purity of 0.999 (FIG. 3). FIG. 7 shows that the particles were similar to those made with ammonia, i.e. aggregates of 0.2 to 0.5 μm in diameter, consisting of 0.1 to 0.2 μm primary particles. However, at relatively low nitrogen flow rates (13 to 62 cm³/min (0.79 to 3.78 in³/min)), at least some aluminum powder was collected on the filter. Low nitrogen and high argon flow rates provided insufficient nitriding gas and residence time to convert the aluminum vapor to AlN. Although, thermodynamically, high purity AlN powders could be obtained between 1673 and 1873 K. (FIG. 3), kinetically, nitrogen is less reactive than ammonia. A mixture of AlN with aluminum was produced at 1873 K. by increasing the nitrogen flow rate to 62.4 cm³/min (3.81 in³/min) and reducing argon flow rate to 131 cm³/min (7.99 in³/min) (expt. #13, Table 1). At 164 cm³/min (10 in³/min) pure AlN was formed at 1673 K., at an argon flow rate of 640 cm³/min (39.1 in³/min) (expt. #10, Table 1).

AlN powder produced at 1873 K. and 860 (52.5 in³/min) and 2690 cm³/min (164.2 in³/min) ammonia and Ar flow rates respectively (expt. #3, Table 1), was compared to three high surface area powders received from Mitsui-Toatsu Chemicals (Grades MAN-5 and MAN-10) and The Dow Chemical Company.

The agglomerate powders of the present invention are finer and exhibit a narrower size distribution than the Mitsui-Toatsu and The Dow Chemical Company powders. The powders of the present invention have a primary particle size, as determined by TEM which is finer than the commercial powders. These two results indicate the enhanced low temperature sinterability of the powders of the present invention. The powders made by process of the present invention also have substantially higher specific surface areas than presently available powders. Table 2 summarizes the comparison between the powder properties.

TABLE 2

Comparisons with commercially available AlN powders

| AlN Particle Properties | This work | Mitsui-Toastu MAN-5 | Mitsui-Toastu MAN-10 | Dow |
|---|---|---|---|---|
| Surface Area (m²/g) | 25 ± 2 | 4.8 | 8.8 | 3.4 |
| Oxygen content (wt %) | 8.8 | 1.02 | 1.21 | 1.24 |
| Median agglomerate size ($d_{50}$, μm) | 0.55 | 1.18 | 0.85 | 1.6 |
| Agglomerate size spread ($d_{90}/d_{10}$) | 4.9 | 6.8 | 5.6 | 6.8 |
| Median primary particle size (μm) | 0.16 ± 0.04 | 0.38 | 0.23 | 0.42 |
| Primary particle size spread ($d_{90}/d_{10}$) | 5.6 | 3 | 5 | 2 |

In summary, aluminum nitride powders were produced by direct nitridation of aluminum vapor with ammonia and nitrogen in argon carrier gas preferably in an aerosol flow reactor. Ammonia, however, was far more reactive than nitrogen at the employed temperature and reactant stoichiometries. Pure AlN powders were obtained by nitridation of aluminum with $NH_3$ and $N_2$ between 1400 and 1873 K. The specific surface area of these powders was substantially higher than that of commercially available AlN. Both the crystallite size and the BET grain size of pure AlN powders slightly decreased as ammonia flow rate was increased. Increasing temperature and flow rate increased the AlN yield. The employed small particle sizes (from aluminum molecules to molecular clusters) favored complete nitridation of aluminum and formation of high purity AlN. The powders of the present invention are finer than commercial ones from Mitsui-Toatsu and The Dow Chemical Company and should therefore be better suited for low temperature sintering. Conventional high temperature sintering processes are carried out at about 2100 K. The powders of the present invention permit the sintering process to be carried out at about 1900 K. It is believed that the powders of the present invention may permit the sintering process to be carried out at about 1750 K.

Figure 8:
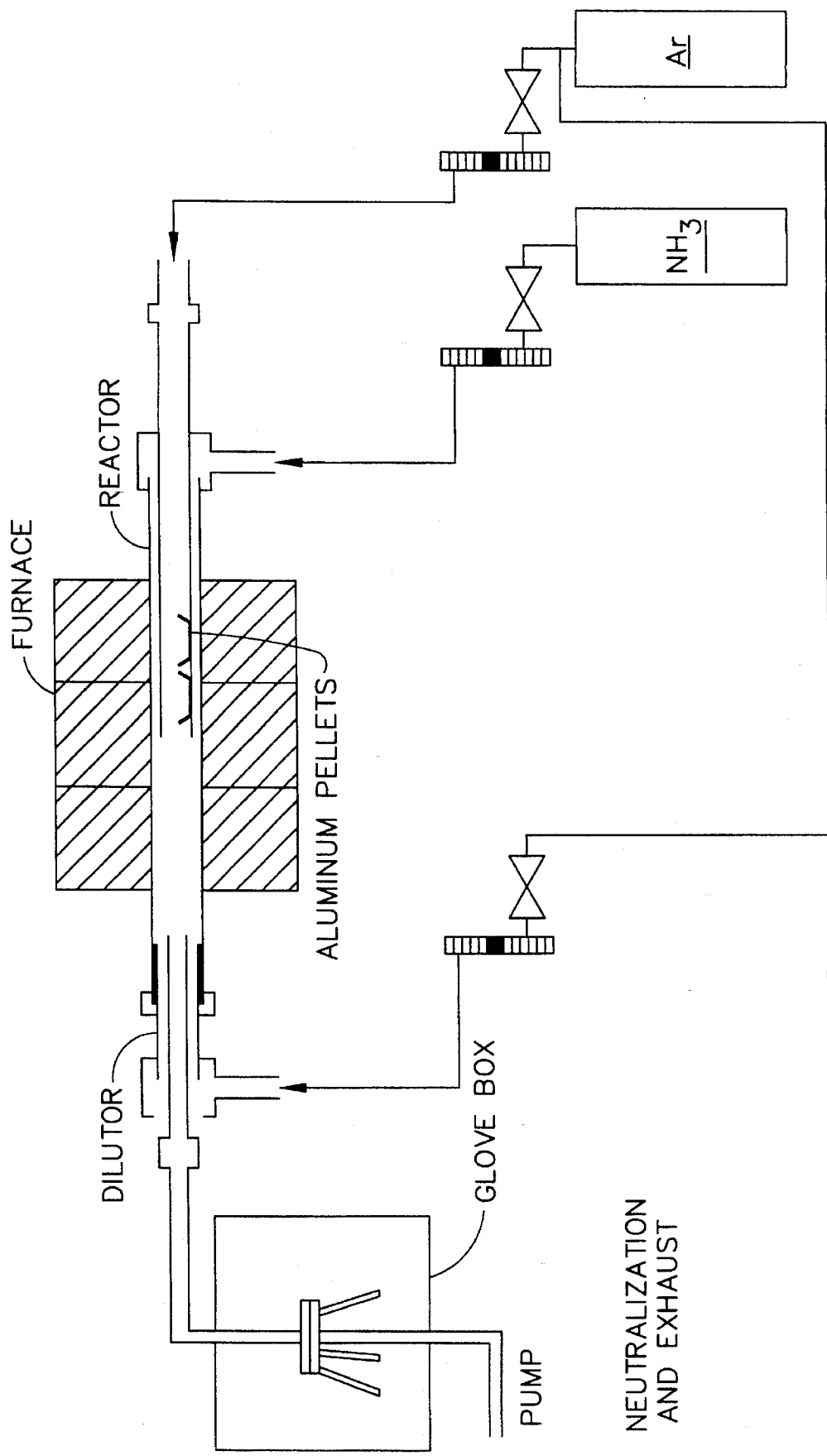
FIG. 8 is a schematic of yet another apparatus for practicing the present invention.

A further embodiment of the processes of the present invention was carried out using the experimental set up shown in FIG. 8. Aluminum pellets (99.99% pure, Aldrich) were placed in alumina boats in an alumina tube (Coors Ceramics Co., 1.6 cm (0.625') outside diameter, 1.3 cm (0.50') inside diameter) heated by a furnace (Lindberg) having a maximum operating temperature of 1973 K. The aluminum vapors generated in the inner tube were carried by a carrier gas, argon (99.99%, Wright Brothers), into the reactor (outer tube) (Coors Ceramics Co., 3.8 cm (1.5') outside diameter, 3.2 cm (1.25') inside diameter, 152.4 cm (5 ft) long).

The nitriding gas (gaseous ammonia) was introduced through the reactor. A dilution gas (argon) was introduced through the dilution system. The dilution system consisted of two concentric tubes. The dilution gas entered through an annular region, mixed with a reactor effluent and exited through the inner tube. Gas flows were controlled using rotameters. The aluminum nitride powder formed by the reaction of aluminum with ammonia was collected in a filter placed downstream of the reactor. The filter was housed in a glove box (VWR Scientific). The apparatus was sealed to prevent oxygen contamination. The exhaust gases were vented through a laboratory hood. Sufficiently high argon flow rates were maintained to prevent the possibility of ammonia diffusing into the inner tube. In this design, as ammonia did not come in contact with the molten aluminum in the boat, the problem of nitridation of the molten aluminum was overcome (no oxynitrides were formed).

The processes of the present invention differ from prior art processes in yet another respect. The processes of the present invention are environmentally benign in that the byproduct produced (hydrogen) is inherently separated and recyclable.

Large quantities of chemicals are released into the environment each year as by-products of manufacturing processes carried out by the chemical and chemistry-dependent industries. These chemicals are a serious threat to the environment and a waste of valuable resources. It is recognized that economic competitiveness and environmental protection are mutually improved by waste reduction, and this has led to major efforts to improve chemical processing and syntheses methods employed by industries. While zero discharge and zero waste are unattainable in practice, byproduct production and pollution at the manufacturing source can be minimized. Hence the focus lies on designing environmentally benign processing methodologies that will support the clean, efficient and profitable industries of tomorrow.

In the carbothermal route for synthesis of AlN, carbon monoxide is a byproduct of the reduction reaction of aluminum oxide with carbon. The unreacted carbon in the product is removed by controlled oxidation, which results in emission of oxides of carbon. The $AlCl_3/NH_3$ route for synthesis of AlN is ideal from the product purity standpoint. However, this process is not environmentally benign as it results in hydrochloric acid and ammonium chloride as byproducts. On the other hand, the processes of the present invention produce only hydrogen (if ammonia is used as the nitriding gas), which is automatically separated from the AlN and which is also environmentally benign. Therefore, the processes of the present invention constitute a logical choice from the environmental point of view.

Thus it is apparent that there has been provided in accordance with the present invention, processes for producing aluminum nitride powder having improved low temperature sinterability which fully satisfy the objects, aspects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations which fall within the spirit and scope of the appended claims.

We claim:

1. A process for manufacturing nitride powders comprising the steps of:
   introducing a vapor selected from the group consisting of aluminum, boron and titanium, at a first position within an aerosol furnace reactor;
   introducing a nitriding gas at a second position within said aerosol furnace reactor upstream of said first position, at a minimum equivalence ratio of approximately 1.0;
   maintaining said aerosol furnace reactor at a temperature equal to or greater than 1,400 K. by external heating and at atmospheric pressure; and
   contacting and reacting said vapor with said nitriding gas to produce nitride powder selected from the group consisting of aluminum nitride, boron nitride and titanium nitride.

2. The process of claim 1, wherein said vapor is introduced into said aerosol reactor by means of a carrier gas.

3. The process of claim 2, wherein said carrier gas is selected from the group consisting of the noble gases, nitrogen, hydrogen and mixtures thereof.

4. The process of claim 1, wherein said nitriding gas is selected from the group consisting of nitrogen, ammonia and mixtures thereof.

5. The process of claim 1, wherein said vapor is generated using a method selected from the group consisting of electron beam heating, arc heating, plasma and electric current heating.

6. The process of claim 1, wherein the aerosol reactor is substantially nonoxidizing at all times until removal of the nitride powder.

7. The process of claim 1, wherein said aerosol reactor temperature ranges from 1400–1973 K.

8. The process of claim 1, wherein said nitride powder is aluminum nitride powder in the form aggregates varying from 0.05 to 10 μm in diameter.

9. The process of claim 8 wherein said aggregates are made up of grains between 0.05 to 0.5 μm in diameter.

10. The process of claim 1, wherein said nitride powder is aluminum nitride powder capable of being sintered at temperatures greater than or equal to 1750 K.

11. The process of claim 1, wherein said nitride powder is aluminum nitride powder having a narrow particle size distribution and a minimum specific surface area of 10 $m^2/g$.

12. The process of claim 1, wherein said process does not lead to the formation of oxynitrides.

13. A process for manufacturing nitride powders comprising the steps of:
   generating, from a vapor source, an elemental vapor selected from the group consisting of aluminum, boron and titanium;
   introducing said vapor within an aerosol furnace reactor using a carrier gas;
   introducing a nitriding gas within said aerosol furnace reactor so as to prevent contact between said nitriding gas and said vapor source, at a minimum equivalence ratio of approximately 1.0;
   maintaining said aerosol furnace reactor at a temperature equal to or greater than 1.400 K. by external heating and at atmospheric pressure; and
   contacting and reacting said vapor with said nitriding gas to produce nitride powder selected from the group consisting of aluminum nitride, boron nitride and titanium nitride.

14. The process of claim 13, wherein said carrier gas is selected from the group consisting of the noble gases, nitrogen, hydrogen and mixtures thereof.

15. The process of claim 13, wherein said nitriding gas is selected from the group consisting of nitrogen, ammonia and mixtures thereof.

16. The process of claim 13, wherein said vapor is generated using a method selected from the group consisting of electron beam heating, arc heating, plasma and electric current heating.

17. The process of claim 13, wherein the aerosol reactor is substantially non-oxidizing at all times until removal of the nitride powder.

18. The process of claim 13, wherein said aerosol reactor temperature ranges from 1400–1973 K.

19. The process of claim 13, wherein said nitride powder is aluminum nitride powder in the form of aggregates varying from 0.05 to 10 μm in diameter.

20. The process of claim 19 wherein said aggregates are made up of grains between 0.05 to 0.5 μm in diameter.

21. The process of claim 13, wherein said nitride powder is aluminum nitride powder capable of being sintered at temperatures greater than or equal to 1750 K.

22. The process of claim 13, wherein said nitride powder is aluminum nitride powder having a narrow particle size distribution and a minimum specific surface area of 10 $m^2/g$.

23. The process of claim 13, wherein said process does not lead to the formation of oxynitrides.

* * * * *